(12) United States Patent
Pierpont

(10) Patent No.: US 6,324,847 B1
(45) Date of Patent: Dec. 4, 2001

(54) DUAL FLOW TURBINE HOUSING FOR A TURBOCHARGER IN A DIVIDED MANIFOLD EXHAUST SYSTEM HAVING E.G.R. FLOW

(75) Inventor: David A. Pierpont, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/617,907

(22) Filed: Jul. 17, 2000

(51) Int. Cl.$^7$ ............................................. F02B 33/44
(52) U.S. Cl. .................. 60/605.2; 60/605.1; 60/602; 415/116; 415/117; 415/184
(58) Field of Search .................. 60/605.2, 605.1, 60/602; 415/116, 117, 184

(56) References Cited

U.S. PATENT DOCUMENTS

| | | | |
|---|---|---|---|
| 94,868 | * 9/1869 | Chase | 415/184 |
| 228,629 | * 6/1880 | Hacheney | 415/184 |
| 1,910,279 | * 5/1933 | Buchi | 60/605.1 |
| 2,730,861 | * 1/1956 | Buchi | 60/605.1 |
| 3,137,477 | * 6/1964 | Kofink | 415/184 |
| 3,383,092 | 5/1968 | Cazier | 60/605.1 |
| 3,614,259 | 10/1971 | Neff . | |
| 3,930,747 | 1/1976 | Woollenweber | 60/605.1 |
| 4,008,572 | 2/1977 | Woollenweber, Jr. | 60/602 |
| 4,009,574 | 3/1977 | Melchior . | |
| 4,179,892 | * 12/1979 | Heydrich | 60/605.2 |
| 4,231,225 | 11/1980 | Aya . | |
| 4,249,382 | 2/1981 | Evans et al. . | |
| 4,250,711 | 2/1981 | Zehnder . | |
| 5,791,146 | * 8/1998 | Dungner | 60/605.2 |
| 5,937,650 | * 8/1999 | Arnold | 60/605.2 |
| 6,145,313 | * 11/2000 | Arnold | 60/605.2 |
| 6,164,071 | * 12/2000 | Shao et al. | 60/605.2 |
| 6,185,939 | * 2/2001 | Coleman et al. | 60/605.2 |

* cited by examiner

Primary Examiner—Thomas Denion
Assistant Examiner—Thai-Ba Trieu
(74) Attorney, Agent, or Firm—Todd T. Taylor

(57) ABSTRACT

An internal combustion engine, particularly suitable for a vehicle, is provided with a plurality of combustion cylinders, a first exhaust manifold, a second exhaust manifold and an intake manifold. Each exhaust manifold is coupled with a plurality of the combustion cylinders. An EGR system is disposed in fluid flow communication between the first exhaust manifold and the intake manifold. A turbocharger includes a compressor having an inlet receiving combustion gas and an outlet in fluid flow communication with the intake manifold. A turbine is drivingly coupled to the compressor, and has a turbine casing and a turbine wheel. The turbine casing defines separate first and second inlet paths for exhaust gas flow from the first and second exhaust manifolds. Efficiency and performance are improved by preserving pulse energy in one exhaust manifold flow, and increasing back pressure in the manifold providing EGR flow.

14 Claims, 2 Drawing Sheets

DUAL FLOW TURBINE HOUSING FOR A TURBOCHARGER IN A DIVIDED MANIFOLD EXHAUST SYSTEM HAVING E.G.R. FLOW

TECHNICAL FIELD

The present invention relates to internal combustion engine turbochargers and exhaust gas recirculation systems, and, more particularly, to a turbine housing for a turbocharger in a system having a divided manifold.

BACKGROUND ART

A limiting factor in the performance of an internal combustion engine is the amount of combustion air that can be delivered to the intake manifold for combustion in the engine cylinders. Atmospheric pressure is often inadequate to supply the required amount of air for proper operation of an engine at high efficiency. Therefore, it is common practice to use an auxiliary system to supply additional air to the intake manifold.

An internal combustion engine may include one or more turbochargers for compressing air that is then supplied to the combustion cylinders. Each turbocharger typically includes a turbine driven by exhaust gases of the engine, and a compressor that is driven by the turbine. The compressor receives air to be compressed, and supplies the compressed air to the combustion cylinder. The turbocharger supplies combustion air to the engine at a higher pressure and higher density than atmospheric pressure and ambient density. The turbocharger can be used to make up for a loss of power due to altitude, or to increase the power that can be obtained from an engine of a given displacement, thereby reducing the cost, weight and size of an engine for a given power output.

Many on the highway truck diesel engines use a divided exhaust manifold system. A divided exhaust system helps preserve the exhaust pulse energy from the cylinders, to be provided to the turbocharger for more efficient operation. At the instant that exhaust valve opens at the start of an exhaust cycle for a combustion cylinder, the cylinder is filled with hot gas at a high temperature. When the valve opens, exhaust gas immediately surges from the cylinder and travels past the exhaust valve or port at high velocity. A major portion of the exhaust gas surges from the cylinder during this short period. During the remainder of the exhaust cycle, while the exhaust valve remains open, a remaining portion of the exhaust gas continues to escape from the cylinder, due either to the upward travel of the piston or to the flow of air entering the cylinder. Thus, in looking at an entire exhaust gas cycle, as the exhaust valve opens an initial surge of exhaust gas occurs, which contains substantial portion of the overall energy available. This surge is typically followed by a much longer period with gas flow at much lower velocity. Preserving the energy in the exhaust pulses, to be conveyed to the turbine, improves overall turbocharger performance efficiency.

It is also common to use exhaust gas recirculation systems (EGR systems) for controlling the generation of undesirable pollutant gases and particulate matter in the operation of an internal combustion engine. EGR systems have proven particularly useful for on the road motor equipment. In a typical EGR system, exhaust gas byproducts are recirculated to the intake air supply of the internal combustion engine. The result is a decrease in the concentration of oxygen, which in turn lowers the maximum combustion temperature within the cylinder, and slows the chemical reaction of the combustion process, thereby decreasing the formation of nitrous oxides (NOX). Unburned hydrocarbons in the exhaust gases can be burned on reintroduction to the engine cylinder, further reducing the emission of exhaust gas byproducts.

When utilizing EGR in a turbocharged diesel engine, the exhaust gas to be recirculated is normally removed upstream of the exhaust gas driven turbine associated with the turbocharger. In many applications, the exhaust gas is diverted directly from the exhaust manifold. In a divided exhaust manifold system, an EGR system is typically designed to take exhaust gas from both sides of the divided nanifold system. Using this approach, it is difficult to preserve the exhaust pulse energy from the cylinders to the turbocharger. EGR systems removing exhaust gases from both sides of a divided manifold greatly diminish the pulse energy available from the system.

Divided turbine housings are known. For example, U.S. Pat. No. 3,614,259 entitled, "Turbine Casing", discloses a turbine having a divided volute in the housing, with a flapper valve controlling the flow to each of the volute portions. Divided exhaust manifolds directed to separate turbine inlets are know, for example, from U.S. Pat. No. 3,383,092 entitled "Gas Turbine With Pulsating Gas Flows". Neither compensates for reduced exhaust flow from an exhaust manifold supplying EGR flow.

The present invention is directed to overcoming one or more of the problems as set forth above.

DISCLOSURE OF THE INVENTION

In one aspect of the invention, an internal combustion engine is provided with a plurality of combustion cylinders; a first exhaust manifold and a second exhaust manifold, each coupled with a plurality of the combustion cylinders; and an intake manifold coupled with the plurality of combustion cylinders. An EGR system is disposed in fluid flow communication between the first exhaust manifold and the intake manifold. A turbocharger includes a compressor having an inlet receiving combustion gas and an outlet in fluid flow communication with the intake manifold. A turbine is drivingly coupled to the compressor, and has a turbine casing and a turbine wheel disposed in the casing. The turbine casing defines a bifurcated inlet and an outlet. The turbine bifurcated inlet has a first inlet path in fluid flow communication with the first exhaust manifold and a second inlet path in fluid flow communication with the second exhaust manifold.

In another aspect of the invention, a turbocharger and exhaust gas recirculation system is provided for an internal combustion engine having a plurality of combustion cylinders, a first exhaust manifold, a second exhaust manifold and an intake manifold each coupled with a plurality of the combustion cylinders. The turbocharger and exhaust gas recirculation system has an EGR duct disposed in fluid flow communication between the first exhaust manifold and the intake manifold. A turbocharger includes a compressor having an inlet receiving combustion gas and an outlet in fluid flow communication with the intake manifold. A turbine is drivingly coupled to the compressor, and has a turbine casing defining a bifurcated inlet and an outlet. The turbine bifurcated inlet has a first inlet path in fluid flow communication with the first exhaust manifold and a second inlet path in fluid flow communication with the second exhaust manifold.

In still another aspect of the invention, a method of operating an internal combustion engine is provided, including providing a plurality of combustion cylinders, a first exhaust manifold, a second exhaust manifold and an intake manifold; transporting exhaust gas from a plurality of the combustion cylinders to the first exhaust manifold and to the second exhaust manifold; providing a turbocharger including a turbine having an inlet and an outlet, and a compressor having an inlet and an outlet; providing a first inlet path and a second inlet path in the turbine inlet; rotatably driving the turbine with exhaust gas introduced at the first inlet path from the first exhaust manifold and with exhaust gas introduced at the second inlet path from the second exhaust manifold; introducing combustion gas at the compressor inlet; transporting combustion gas from the compressor outlet to the intake manifold; and providing an exhaust gas recirculation duct interconnecting the first exhaust manifold with the intake manifold, and re-circulating exhaust gas in the exhaust gas re-circulation duct.

BEST MODE FOR CARRYING OUT THE INVENTION

Figure 1:
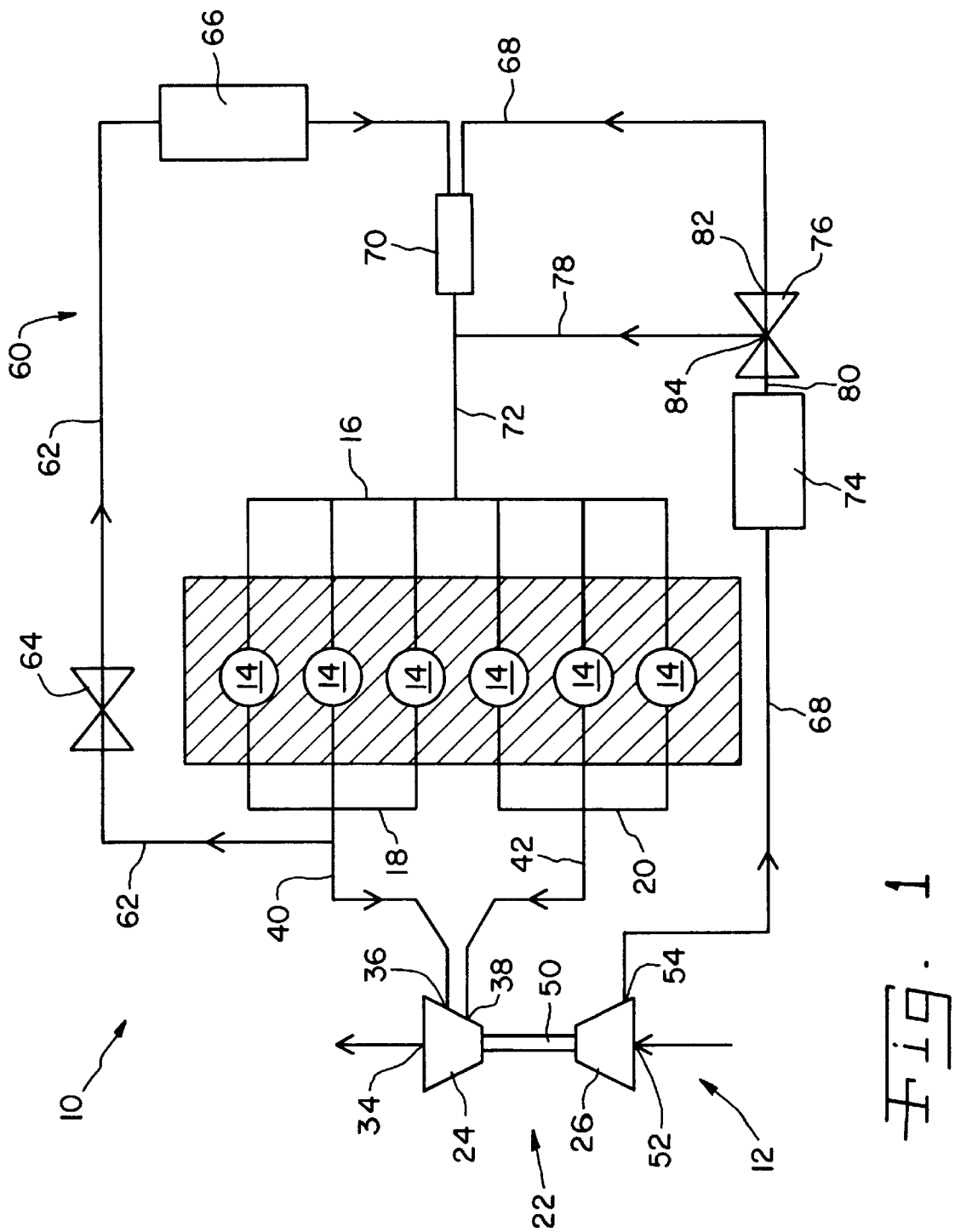
FIG. 1 is a schematic representation of an engine having a dual flow turbine housing in accordance with the present invention, for a divided manifold exhaust system having exhaust gas recirculation.

Referring now to the drawings, and to FIG. 1 in particular, an internal combustion engine 10 is shown having a turbocharger system 12 in which a turbine housing in accordance with the present invention may be used advantageously.

Internal combustion engine 10 includes a plurality of combustion cylinders 14, and as shown in FIG. 1, includes six combustion cylinders 14. Each combustion cylinder 14 is coupled with a corresponding intake manifold 16 and with an exhaust manifold 18, 20. While a single intake manifold 16 is shown, it should be understood that more than one intake manifold may be used with or coupled to each combustion cylinder 14, for providing an air mixture to each combustion cylinder 14. A fuel, such as diesel fuel is injected into each combustion cylinder and combusted therein, in a known manner.

Internal combustion engine 10 includes a first exhaust manifold 18 and a second exhaust manifold 20. First exhaust manifold 18 is fluidly coupled with three of the combustion cylinders 14, and second exhaust manifold 20 is fluidly coupled with the remaining three combustion cylinders 14.

Turbocharger system 12 includes a turbocharger 22 having a turbine 24 and a compressor 26.

Figure 2:
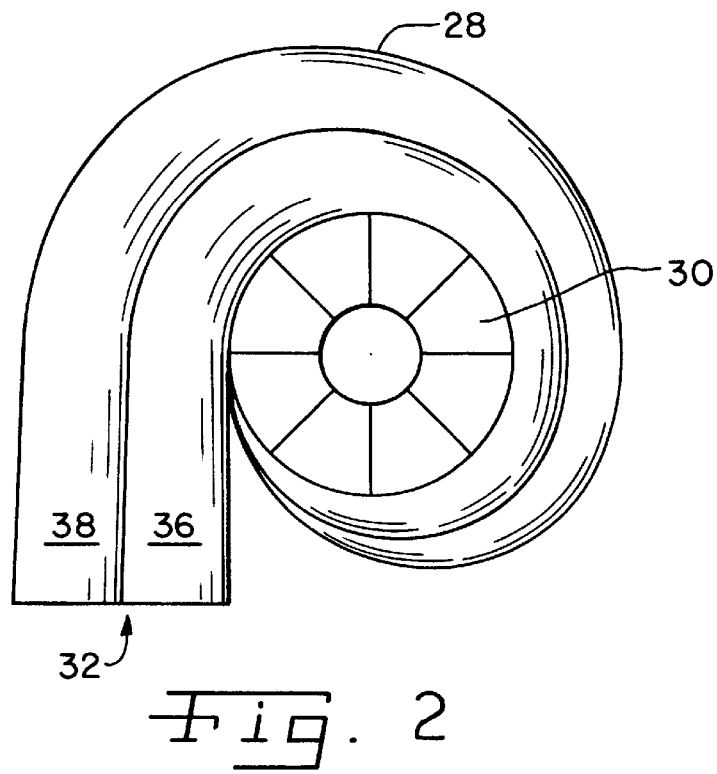
FIG. 2 is an elevational view of a turbine housing in accordance with the present invention, the view taken in an axial direction relative to the tubing wheel.
Figure 3:
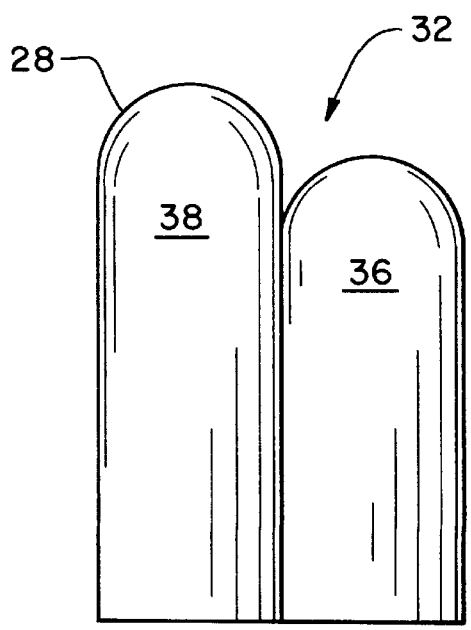
FIG. 3 is an elevational view of the side of a turbine housing in accordance with the present invention.

As shown more clearly in FIG. 2, turbine 24 includes a turbine casing 28 having a turbine wheel 30 operatively disposed for rotation therein. Turbine casing 28 defines a turbine bifurcated inlet 32 and a turbine outlet 34 (FIG. 1). Bifurcated inlet 32 includes a first inlet path 36 in fluid flow communication with first exhaust manifold 18 and a second inlet path 38 in fluid flow communication with second exhaust manifold 20. Turbine casing 28 and inlet 32 thereof define a volute supplying exhaust gas flow from first exhaust manifold 18 and from second exhaust manifold 20, tangentially to the area near turbine wheel 30, to flow through the turbine wheel 30 and rotate the turbine wheel in known manner before exiting turbine 24 through turbine outlet 34.

First inlet path 36 and second inlet path 38 define separately a first volute and a second volute, respectively, the first volute having a smaller radius than the second volute. First inlet path 36 is of smaller volume than second inlet path 38, the radius of the volute defined thereby being smaller than the radius of the second volute defined by second inlet path 38. A fluid conduit 40 connects first exhaust manifold 18 to first inlet path 36, and a fluid conduit 42 fluidly connects second exhaust manifold 20 to second inlet path 38.

Turbine wheel 30 is disposed on a shaft 50 drivingly coupled to a compressor wheel (not shown) in compressor 26. A compressor inlet 52 and a compressor outlet 54 are provided for compressor 26. Compressor inlet 52 receives combustion gas from a source such as ambient air, and compressor outlet 54 supplies compressed combustion gas to intake manifold 16.

It should be understood that compressor 26 is shown in schematic representation, and may include one or more compressor wheels providing one or more stages of compression. A suitable interstage duct, interstage cooler and the like may be provided in a turbocharger have multiple compressor wheels.

An exhaust gas recirculation (EGR) system 60 includes a duct 62 receiving exhaust gas from first exhaust manifold 18, to direct the exhaust gas to intake manifold 16. Duct 62 is connected to conduit 40 in fluid flow communication, and includes a valve 64 for controlling the flow of exhaust gas through duct 62. A cooler 66 may be provided in duct 62 to lower the temperature of exhaust gas provided to intake manifold 16.

A fluid conduit 68 fluidly couples compressor outlet 54 to a mixer 70. Mixer 70 also receives exhaust gas flow from duct 62, and controls the mixture of compressed combustion gas from compressor 26 with exhaust gas recirculated from exhaust gas recirculation system 60, and provides the mixture thereof to intake manifold 16 through a fluid conduit 72.

An optional aftercooler 74 may be provided in fluid conduit 68, and a valve 76 in conduit 68 may direct compressed gas flow to mixer 70 or through a fluid conduit 78 directly to fluid conduit 72, thereby bypassing mixer 70. Valve 76 includes an inlet 80 connected in fluid flow communication to conduit 68, and receives compressed combustion gas from compressor 26. Valve 76 further includes a first outlet 82 connected to conduit 68, for directing compressed combustion gas flow towards mixer 70, and a second outlet 84 connected in fluid flow communication to fluid conduit 78.

INDUSTRIAL APPLICABILITY

During use of engine 10, a fuel, such as diesel fuel, is injected into combustion cylinders 14 and combusted when a piston (not shown) disposed within each combustion cylinder 14 is at or near a top dead center position. Exhaust gas is transported from each combustion cylinder 14 to the exhaust manifold associated with it, either first exhaust manifold 18 or second exhaust manifold 20. Exhaust gas within first exhaust manifold 18 is transported to first inlet path 36 and exhaust gas from second exhaust manifold 20 is transported to second inlet path 38, for rotatably driving turbine wheel 30. Turbine 24 in turn rotatably drives compressor 26 via shaft 50. The spent exhaust gas is discharged from turbine 24 to the ambient environment through turbine outlet 34.

Exhaust gas is recirculated from first exhaust manifold 18 to intake manifold 16 via EGR duct 62, mixer 70 and fluid conduit 72. Exhaust gas for EGR system 60 is drawn only from first intake manifold 18, and not from second intake manifold 20. Therefore, pulse energy present in the exhaust flow from second exhaust manifold 20 is preserved in the flow through second inlet path 38 for use in, and improved performance of turbine 24. While much of the pulse energy is lost from the exhaust flow of first exhaust manifold 18 due to the diversion of exhaust gas through EGR duct 62, use of the present invention results in an improvement in overall turbocharger efficiency. The dual flow turbine housing compensates for reduced exhaust gas flow in first inlet path 36 by providing a smaller overall volume in first inlet path 36 than the overall volume of second inlet path 38. This results in a higher exhaust back pressure in first inlet path 36, and improved EGR flow. When coupled with the preservation and utilization of pulse energy in the exhaust gas flow from second exhaust manifold 20, an overall improvement in turbine efficiency results.

Compressor 26 draws combustion air into compressor inlet 52. The combustion air is compressed within compressor 26 and is discharged from compressor 26 through compressor outlet 54 and fluid conduit 68. The compressed combustion air is cooled within aftercooler 74 and is transported to intake manifold 16 via mixer 70 and fluid conduit 72 for use in combustion occurring within combustion cylinders 14.

Mixer 70 combines fluid flow from EGR duct 62 and from fluid conduit 68, and supplies the mixture thereof to intake manifold 16 through fluid conduit 72. Valve 76 may be operated to bypass some or all of the compressed gas flow in conduit 68 to conduit 72 and intake manifold 16, bypassing mixer 70. EGR flow rate in duct 62 is controlled by valve 64.

The turbocharger of the present invention preserves exhaust gas pulse energy from the cylinders to the turbo for at least one exhaust manifold of a divided exhaust manifold system, and compensates for the reduced exhaust flow from the manifold supplying exhaust gas to the EGR system. Performance of the turbocharger and overall operation efficiency of the engine are thereby improved.

Other aspects, objects and advantages of this invention can be obtained from a study of the drawings, the disclosure and the appended claims.

What is claimed is:

1. An internal combustion engine, comprising:
    a plurality of combustion cylinders;
    a first exhaust manifold and a second exhaust manifold, each said first exhaust manifold and said second exhaust manifold coupled with a plurality of said combustion cylinders;
    an intake manifold coupled with said plurality of combustion cylinders;
    an EGR system disposed in fluid flow communication between said first exhaust manifold and said intake manifold;
    a turbocharger including a compressor having an inlet receiving combustion gas and an outlet in fluid flow communication with said intake manifold, and a turbine drivingly coupled to said compressor, said turbine having a turbine casing and a turbine wheel disposed in said casing, said casing defining a bifurcated inlet and an outlet, said turbine bifurcated inlet having a first inlet path in fluid flow communication with said first exhaust manifold and a second inlet path in fluid flow communication with said second exhaust manifold, said first inlet path being of smaller volume than said second inlet path;
    a mixer in fluid flow communication to receive fluid flows from said EGR system and from said compressor outlet, and to provide a mixture of said flows to said intake manifold; and
    a fluid bypass conduit interconnecting said compressor outlet and said intake manifold for selectively bypassing said mixer.

2. The internal combustion engine of claim 1, said first inlet path and said second inlet path defining first and second volutes, said first volute being of smaller radius than said second volute, and being in fluid flow communication with said first exhaust manifold.

3. The internal combustion engine of claim 2, including a fluid conduit between said first exhaust manifold and said first inlet path, and said EGR system having a duct in fluid flow communication with said conduit at a location between said first exhaust manifold and said first inlet path.

4. The internal combustion engine of claim 1, including an aftercooler fluidly interconnecting said compressor outlet and said mixer.

5. The internal combustion engine of claim 1, including a fluid conduit between said first exhaust manifold and said first inlet path, and said EGR system having a duct in fluid flow communication with said conduit at a location between said first exhaust manifold and said first inlet path.

6. The internal combustion engine of claim 5, including an aftercooler fluidly interconnecting said compressor outlet and said mixer.

7. A turbocharger and an exhaust gas recirculation system for an internal combustion engine having a plurality of combustion cylinders, a first exhaust manifold and a second exhaust manifold each coupled with a plurality of said combustion cylinders, and an intake manifold coupled with said plurality of combustion cylinders; said turbocharger and exhaust gas recirculation system comprising;
    an EGR duct disposed in fluid flow communication between said first exhaust manifold and said intake manifold;
    a turbocharger including a compressor having an inlet receiving combustion gas and an outlet in fluid flow communication with said intake manifold, and a turbine drivingly coupled to said compressor, said turbine having a turbine casing and a turbine wheel disposed in said casing, said casing defining a bifurcated inlet and an outlet, said turbine bifurcated inlet having a first inlet path in fluid flow communication with said first exhaust manifold and a second inlet path in fluid flow communication with said second exhaust manifold, said first inlet path being of smaller volume than said second inlet path;
    a mixer in fluid flow communication to receive fluid flows from said EGR duct and from said compressor outlet, and to provide a mixture of said flows to said intake manifold; and
    a fluid bypass conduit interconnecting said compressor outlet and said intake manifold for selectively bypassing said mixer.

8. The system of claim 7, said first inlet path and said second inlet path defining first and second volutes, said first volute being of smaller radius than said second volute, and being in fluid flow communication with said first exhaust manifold.

9. The system of claim 8, including a fluid conduit between said first exhaust manifold and said first inlet path, and said EGR duct being in fluid flow communication with said conduit at a location between said first exhaust manifold and said first inlet path.

10. The system of claim 9, including an aftercooler fluidly interconnecting said compressor outlet and said mixer.

11. The system of claim 7, including a fluid conduit between said first exhaust manifold and said first inlet path, and said EGR duct being in fluid flow communication with said conduit at a location between said first exhaust manifold and said first inlet path.

12. The system of claim 7, including an aftercooler fluidly interconnecting said compressor outlet and said mixer.

13. A method of operating an internal combustion engine, comprising, the steps of:

providing a plurality of combustion cylinders, a first exhaust manifold, a second exhaust manifold and an intake manifold;

transporting exhaust gas from a first group of said plurality of said combustion cylinders to said first exhaust manifold and from a second group of said plurality of combustion cylinders to said second exhaust manifold;

providing a turbocharger including a turbine having an inlet and an outlet, and a compressor having an inlet and an outlet;

providing a first inlet path and a second inlet path in said turbine inlet;

rotatably driving said turbine with exhaust gas introduced at said first inlet path from said first exhaust manifold, and with exhaust gas introduced at said second inlet path from said second exhaust manifold;

introducing combustion gas at said compressor inlet;

transporting combustion gas from said compressor outlet to said intake manifold; and providing an exhaust gas recirculation duct interconnecting said first exhaust manifold with said intake manifold, and re-circulating exhaust gas in said exhaust gas re-circulation duct;

preserving pulse energy in exhaust gas flow from said second exhaust manifold to said second inlet path; and providing restricted flow in said first inlet path in comparison to said second inlet path, for increasing back pressure and compensating for reduced exhaust flow in said first inlet path;

providing a mixer, and mixing combustion gas from said compressor with exhaust gas from said exhaust gas recirculation duct; and providing a conduit in fluid flow communication with said compressor outlet and said intake manifold, and bypassing said mixer with combustion gas flow through said conduit.

14. The method of claim 13, including the step of providing a smaller volume first inlet path and a larger volume second inlet path.

\* \* \* \* \*